(12) United States Patent
Balasubramanian et al.

(10) Patent No.: US 10,785,020 B2
(45) Date of Patent: Sep. 22, 2020

(54) HARDWARE OFFLOAD FOR QUIC CONNECTIONS

(71) Applicant: Microsoft Technology Licensing, LLC, Redmond, WA (US)

(72) Inventors: Praveen Balasubramanian, Redmond, WA (US); Nicholas A. Banks, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 15/875,901

(22) Filed: Jan. 19, 2018

(65) Prior Publication Data

US 2019/0229903 A1 Jul. 25, 2019

(51) Int. Cl.
*H04L 9/06* (2006.01)
*H04L 9/08* (2006.01)
(Continued)

(52) U.S. Cl.
CPC .......... *H04L 9/0861* (2013.01); *H04L 9/0631* (2013.01); *H04L 63/0485* (2013.01);
(Continued)

(58) Field of Classification Search
CPC . H04L 9/08; H04L 9/0861; H04L 9/06; H04L 9/0631; H04L 63/04;
(Continued)

(56) References Cited

U.S. PATENT DOCUMENTS 7,437,547 B2 10/2008 Hyder et al.
7,631,182 B1 * 12/2009 Droux ................... H04L 63/166
713/151

(Continued)

FOREIGN PATENT DOCUMENTS

CA 2831705 A * 3/2012 ............. H04L 29/02
CN 105827537 A 8/2016
(Continued)

OTHER PUBLICATIONS

"Large Send Offload—Wikipedia", Retrieved from: https://en.wikipedia.org/w/index.php?title=Large sendoffload&oldid=809525387, Nov. 9, 2017, 10 Pages.
(Continued)

*Primary Examiner* — Jeffrey C Pwu
*Assistant Examiner* — Ali H. Cheema

(57) ABSTRACT

A system for hardware offloading programs a network interface card with a mapping between (i) a connection identification (CID) for one or more Quick User Datagram Protocol Internet Connections (QUIC) data packets and (ii) a symmetric key and a crypto algorithm. When one or more data packets are received over a network, the one or more data packets are parsed to identify the one or more data packets as QUIC data packets and then obtain the CID for the QUIC data packets. The CID is sent to the network interface card that identifies the symmetric key and the crypto algorithm based on the CID to perform a crypto decrypt operation on the QUIC data packets, and reassembles the QUIC data packets, and an encrypt and large send offload (LSO) on transmit. A software control complexity and processing burden is thereby reduced.

20 Claims, 8 Drawing Sheets

(51) Int. Cl.
  *H04L 29/02* (2006.01)
  *H04L 29/06* (2006.01)
  *G06F 9/24* (2006.01)
  *G06F 9/455* (2018.01)
  *H04L 29/08* (2006.01)

(52) U.S. Cl.
  CPC .............. *H04L 63/166* (2013.01); *G06F 9/24* (2013.01); *G06F 9/45558* (2013.01); *H04L 29/02* (2013.01); *H04L 29/08* (2013.01); *H04L 63/0428* (2013.01); *H04L 63/0435* (2013.01); *H04L 69/164* (2013.01); *H04L 69/22* (2013.01)

(58) Field of Classification Search
  CPC ... H04L 63/0485; H04L 63/16; H04L 63/166; H04L 63/0428; H04L 63/0435; H04L 69/164; H04L 69/22; H04L 29/08; H04L 29/02; H04L 12/70; H04L 63/30; H04L 63/0823; H04L 63/0471; H04L 45/745; G06F 9/45558; G06F 9/24; H04N 21/436
  USPC ................ 713/168, 153, 151, 150; 709/228; 380/28, 255; 370/474, 392; 345/505
  See application file for complete search history.

(56) References Cited

U.S. PATENT DOCUMENTS

| | | | | |
|---|---|---|---|---|
| 7,716,730 | B1* | 5/2010 | Droux ................... | H04L 63/166 713/153 |
| 7,746,350 | B1* | 6/2010 | Danilak .................... | G06F 9/24 345/505 |
| 8,417,976 | B2* | 4/2013 | Inoue ..................... | H04L 63/164 380/28 |
| 8,428,087 | B1* | 4/2013 | Vincent ................... | H04L 69/22 370/474 |
| 9,042,403 | B1 | 5/2015 | Vincent et al. | |
| 9,270,608 | B2 | 2/2016 | Starks et al. | |
| 9,384,033 | B2* | 7/2016 | Jain ..................... | G06F 9/45558 |
| 9,742,682 | B2 | 8/2017 | Jain et al. | |
| 10,326,803 | B1* | 6/2019 | Haney ..................... | H04L 63/30 |
| 2004/0117614 | A1* | 6/2004 | Minnick ............. | H04L 63/0428 713/153 |
| 2008/0240432 | A1* | 10/2008 | Belgaied ............. | H04L 63/0428 380/255 |
| 2008/0271134 | A1* | 10/2008 | Johnson .............. | H04L 63/0823 726/13 |
| 2010/0228962 | A1* | 9/2010 | Simon ................. | H04L 63/0471 713/150 |
| 2015/0319250 | A1* | 11/2015 | Vasudevan ............. | H04L 29/08 709/228 |
| 2015/0381494 | A1* | 12/2015 | Cherian ................ | H04L 45/745 370/392 |
| 2017/0005931 | A1 | 1/2017 | Mehta et al. | |
| 2018/0219770 | A1* | 8/2018 | Wu ..................... | G06F 9/45558 |
| 2019/0044705 | A1 | 2/2019 | Deval et al. | |
| 2019/0116535 | A1* | 4/2019 | Szilagyi ................. | H04L 43/12 |

FOREIGN PATENT DOCUMENTS

| | | | | |
|---|---|---|---|---|
| FR | 20170055872 | A * | 6/2017 | ........... H04N 21/436 |
| WO | WO-2018/086076 | A1 * | 5/2018 | ............. H04L 12/70 |

OTHER PUBLICATIONS

"QUIC—Wikipedia", Retrieved from: https://en.wikipedia.org/w/index.php?title=QUIC&oldid=816591136, Dec. 22, 2017, 100 Pages.

Duncan, et al., "Introduction to Receive Side Scaling—Windows drivers: Microsoft Docs", Retrieved from: https://docs.microsoft.com/en-us/windows-hardware/drivers/network/introduction-to-receive-side-scaling, Apr. 20, 2017, 5 Pages.

Duncan, et al., "Overview of Receive Segment Coalescing—Windows drivers\ Microsoft Docs", Retrieved from: https://docs.microsoft.com/en-us/windows-hardware/drivers/network/overview-of-receive-segment-coalescing, Feb. 26, 2019, 1 Page.

Salowey, et al., "AES Galois Counter Mode (GCM) Cipher Suites for TLS", Retreived from https://tools.ietf.org/pdf/rfc5288.pdf, Aug. 2008, 8 Pages.

Langley, et al., "ChaCha20-Poly1305 Cipher Suites for Transport Layer Security (TLS)", Retrieved from https://www.rfc-editor.org/rfc/rfc7905.txt, Jun. 23, 2016, 8 Pages.

"International Search Report & Written Opinion Issued in PCT Application No. PCT/US2018/068096", dated Mar. 7, 2019, 15 Pages.

Duan, et al., "Towards a Scalable Modular QUIC Server", In Proceedings of Workshop on Kernel-Bypass Networks, Aug. 21, 2017, pp. 19-24.

Pismenny, et al., "TLS Offload to Network Devices", Retrieved from: <<https://netdevconf.org/1.2/papers/netdevconf-TLS.pdf>>, Retrieved on: Jan. 11, 2018, 5 Pages.

Iyengar, et al., "QUIC: A UDP-Based Multiplexed and Secure Transport—draft-ietf-quic-transport-06", Retrieved from: <<https://tools.ietf.org/html/draft-ietf-quic-transport-06>>, Sep. 22, 2017, 1-80 Pages.

Fennema, et al., "QUIC cryptography offloading", Retrieved from: <<https://groups.google.com/a/chromium.org/forum/>>, May 30, 2016, 1 Page.

Trammell, Brian., "QUIC packet header complexity", Retrieved from: <<https://github.com/quicwg/base-drafts/issues/148>>, Jan. 13, 2017, 9 Pages.

Stewart, Randall, "Re: [QUIC] Segment offload for UDP-based protocols Re: Requirements", Retrieved from: <<https://www.ietf.org/mail-archive/web/quic/current/msg00240.html>>, Jun. 9, 2016, 3 Pages.

Hudek, et al., "Offloading Checksum Tasks", Retrieved from: <<https://docs.microsoft.com/en-us/windows-hardware/drivers/network/offloading-checksum-tasks>>, Apr. 20, 2017, 4 Pages.

Hudek, et al., "Offloading the Segmentation of Large TCP Packets", Retrieved from: <<https://docs.microsoft.com/en-us/windows-hardware/drivers/network/offloading-the-segmentation-of-large-tcp-packets>>, Apr. 20, 2017, 9 Pages.

"Receive Segment Coalescing (RSC)", Retrieved from: <<https://technet.microsoft.com/en-us/library/hh997024(v=ws.11).aspx>>, Nov. 28, 2012, 3 Pages.

Hudek, et al., "Introduction to Receive Side Scaling", Retrieved from: <<https://docs.microsoft.com/en-us/windows-hardware/drivers/network/introduction-to-receive-side-scaling>>, Apr. 20, 2017, 5 Pages.

Zylva, Ash De, "Windows 10 Device Guard and Credential Guard Demystified", Retrieved from: <<https://blogs.technet.microsoft.com/ash/2016/03/02/windows-10-device-guard-and-credential-guard-demystified/>>, Mar. 2, 2016, 13 Pages.

* cited by examiner

HARDWARE OFFLOAD FOR QUIC CONNECTIONS

BACKGROUND

Communication protocols define the end-to-end connection requirements across a network. QUIC is a recently developed networking protocol that defines a transport layer network protocol that is an alternative to the Transmission Control Protocol (TCP). QUIC supports a set of multiplexed connections over the User Datagram Protocol (UDP) and attempts to improve perceived performance of connection-oriented web applications that currently use TCP. For example, QUIC connections seek to reduce the number of round trips required when establishing a new connection, including the handshake step, encryption setup, and initial data requests, thereby attempting to reduce latency. QUIC also seeks to improve support for stream-multiplexing.

As with TCP, different operations performed during transmission and reception of data packets using QUIC, particularly larger data packets, could benefit from offloading to hardware. However, known hardware offload arrangements implemented for TCP protocols cannot be used in QUIC, which uses the connectionless UDP protocol.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for hardware offloading comprises programing a network interface card with a mapping between (i) a connection identification (CID) for one or more QUIC data packets and (ii) a symmetric key and a crypto algorithm. The computerized method further comprises identifying the CID for one or more QUIC data packets and sending the CID to the network interface card. The network interface card is configured to perform one of (i) receiving and decrypting the one or more QUIC data packets over a network or (ii) encrypting and transmitting the one or more data QUIC packets over the network, the symmetric key and the crypto algorithm for the decryption or encryption being identified by the network interface card based on the CID for the one or more QUIC data packets. Processing of larger data packets for receiving and transmitting is provided in some examples.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to offload one or more processes to hardware when communicating using the QUIC transport layer protocol. In some examples, receive side scaling (RSS), large send offload (LSO), receive segment coalescing (RSC), and crypto (encryption/decryption) offload are performed in hardware for QUIC communications. A connection identification (ID), also referred to as CID, is hashed from a QUIC packet to facilitate performing different processes, including routing the data traffic to a particular processor (e.g., one of a plurality of central processing units (CPUs)) to perform the different hardware offloaded processes. As a result of offloading tasks, including to different processors, a software control complexity and processing burden (such as for individual processors) is reduced.

It should be noted that hashing is one example method for mapping data traffic. The present disclosure is operable with other mapping methodologies, such as mapping tables.

The hardware of some examples is configured as part of a network interface card to perform at least one of RSS, LSO, RSC or crypto operations, instead of performing these operations in software. As a result, functions associated with these processes are performed more efficiently than when performed by software running on a general-purpose CPU. Additionally, processing data packets for communication using the unique connection identifier (CID) or the unique CID in combination with unique 4-tuples (defining source and destination IP addresses) that identifies a unique local socket address assigned to a socket number in the UDP, allows for the offloading to hardware of functions.

Thus, various examples allow for offloading one or more functions from software to hardware to process data packets for transmission and/or receipt. For example, the present disclosure allows for offloading of one or more computing tasks that are typically performed by a host processor in software, to a specific hardware component, thereby freeing up host processor resources and increasing the overall efficiency of the computer system.

Figure 1:
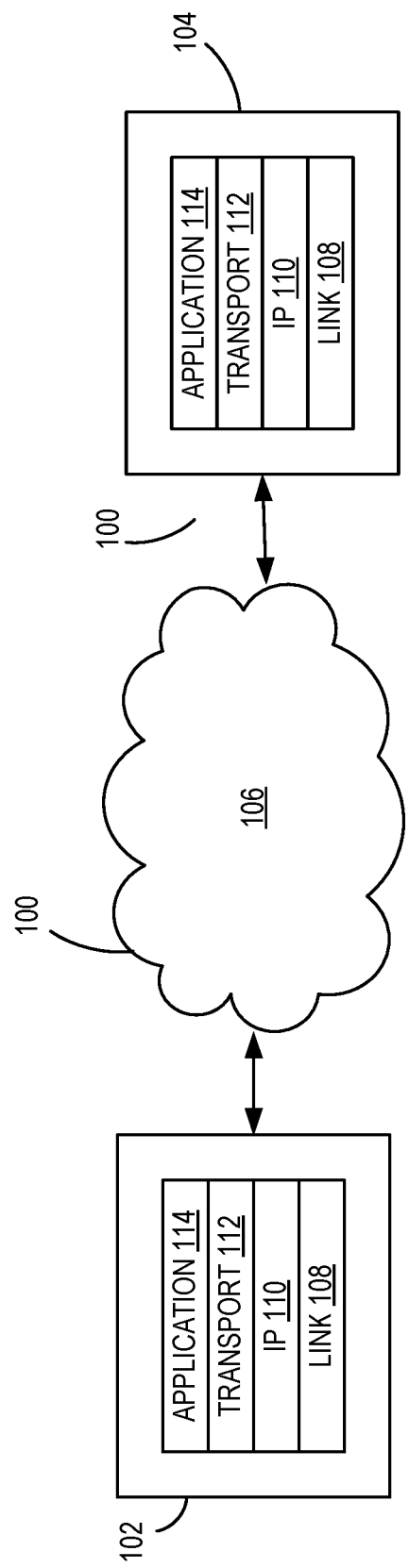
FIG. 1 is an exemplary block diagram illustrating network layers according to an embodiment.

FIG. 1 illustrates a channel 100 established between user devices 102 and 104 via a network 106. The network 106 has a plurality of network layers, illustrated as a link layer 108 (lowest layer), a network layer 110 (illustrated as an Internet Protocol (IP) layer) above the link layer 108, a transport layer 112 (which in various examples is a QUIC transport layer) above the network layer 110, and an application layer 114 above the transport layer 112. The network layers in one example are provided in accordance with a UDP/IP suite utilizing the QUIC transport layer protocol. The application layer 114 provides process-to-process communication between processes running on different hosts (e.g., general purpose computer devices) connected to the network 106, such as the user devices 102 and 104. The transport layer 112 provides end-to-end communication between different hosts, including providing end-to-end connections(s) between hosts for use by the processes. The network (internet) layer 110 provides routing (e.g., communication between different individual portions of the network 106) via routers. The link layer 108 provides communication between physical network addresses, such as Medium Access Control (MAC) addresses of adjacent nodes in the network 106, such as for the same individual network via network switches and/or hubs, which operate at the link layer 108.

In one example, the channel 100 is an application-layer channel at the application layer 114 of the network 106, established between instances of clients, running on the user devices 102 and 104. That is, the channel 100 is a process-to-process channel between the client instances on the user devices 102 and 104.

The (application-layer) channel 100 in some examples is established via one or more transport layer channels between the devices user 102 and 104, often referred to as end-to-end or host-to-host channel(s). Each transport layer channel is established via network layer channel(s) between one of user devices 102 and 104 and a router, or between pairs of routers, which are established via link layer channels within the individual networks of, for example, the Internet. It should be noted that the channel 100 can be a unidirectional channel or a bidirectional channel.

Figure 2:
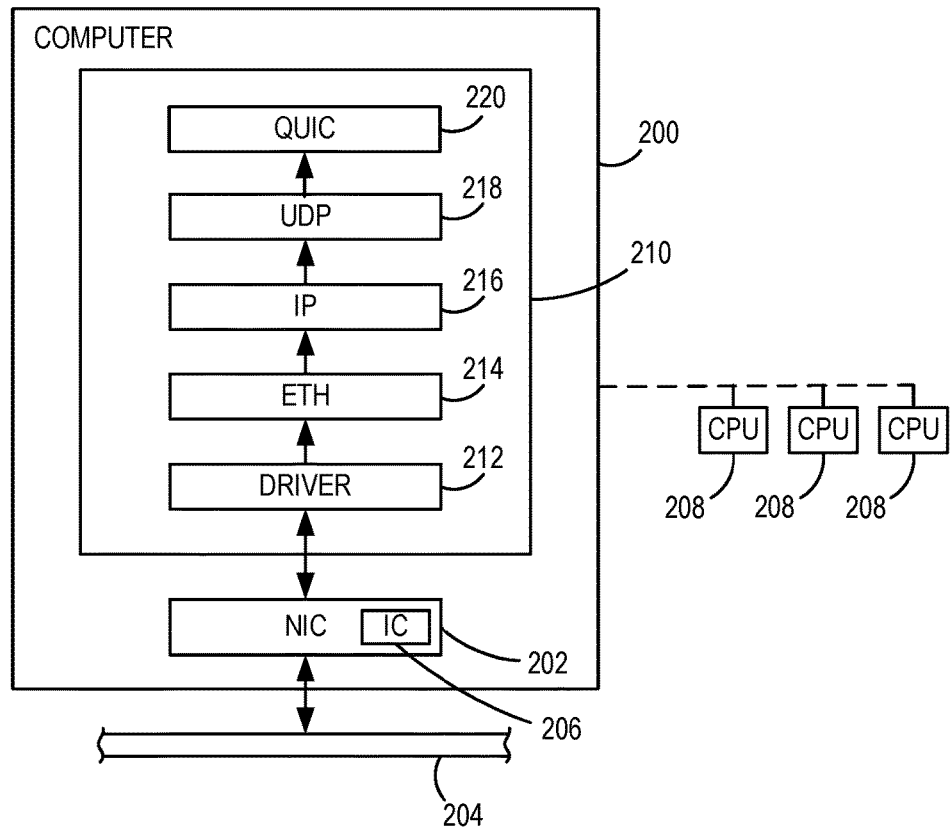
FIG. 2 is an exemplary block diagram of a computer for processing a network stack according to an embodiment.

With reference to FIG. 2, a computer system 200 in one example includes one or more hardware components configured to perform operations offloaded from software, such as RSS, LSO, RSC and crypto offload for QUIC communications. The computer system 200 may be any type of computing device connected to a network. One or more examples increase the efficiency with which packets communicated over a network using QUIC are processed. Accordingly, in some examples, the computer 200 is used in applications that require the computer 200 to send or receive numerous data packets over the network, including larger sized data packets. For example, the computer 200 can be a network server.

The computer system 200 in some examples is connected to other computers through a physical network link. The physical network link can be any suitable transmission medium, such as copper wire, optical fiber or, in the case of a wireless network, air.

In the illustrated example, the computer 200 includes a network interface card (NIC) 202 configured to send and receive packets over a physical network link 204. The specific construction of network interface card 202 depends on the characteristics of physical network link 204. However, the network interface card 202 is implemented in one example with circuitry as is used in the data transmission technology to transmit and receive packets over a physical network link.

The network interface card 202 in one example is a modular unit implemented on a printed circuit board that is coupled to (e.g., inserted in) the computer 202. However, in some examples, the network interface card 202 is a logical device that is implemented in circuitry resident on a module that performs functions other than those of network interface card 202. Thus, the network interface card 202 can be implemented in different suitable ways.

In the illustrated example, the network interface card 202 additionally includes logic that performs processing on data packets to be sent or received over the physical network link 204. In one example, this logic is embodied in electronic circuitry on the network interface card 204 to perform some or all of the offloaded software operations. In some examples, different hardware configurations of the network interface card 204 are provided separate from the network interface card 204 to perform the offloaded functions.

The network interface card 204 includes an integrated circuit 206 and/or other hardware, which contains circuitry to perform the offloaded processing. Additionally, or optionally, the present disclosure contemplates offloading the software functions to other hardware, such as one or more processors, illustrated as CPUs 208. For example, in one example, traffic is spread across the CPUs 208 with a hashing process that utilizes the CID from QUIC and optionally values from the IP address as described in more detail herein. In some examples, the CPUs 208 form part of the network interface card 204.

The integrated circuit 206 in some examples is a programmable logic device, such as one or more field programmable gate arrays, or can be one or more application-specific integrated circuits or other suitable integrated circuits configured to perform a particular offloaded function. As should be appreciated, the CPUs 208 can be hardware components each configured to perform one or more of the offloaded functions from software. It should be appreciated that the integrated circuit 202 and the CPUs 208 in some examples, in addition to performing processing on data packets for send and/or receive operations, perform other functions, which may or may not be related to send and/or receive operations.

Once the network interface card 206 receives a packet and performs processing on the packet, the packet can be further processed by software within the computer 200. For example, the computer 200 includes an operating system 210 that processes packets received by the network interface card 202. The operating system 210 in some examples is implemented in layers, with each layer containing one or more modules. In one example, the computer 200 operates according to a layered protocol and processing performed for each layer of the protocol is implemented in a separate module. However, in some examples, the operations performed by multiple modules may be performed in a single module.

In operation in one example, where the processing of data packets depends on the information within a packet or information that is applicable to certain packets, the processing is offloaded from software to hardware. For example, a determination may be made whether the data stored in a packet buffer within the network interface card 202 has fields characteristic of headers for Ethernet (ETH), IP and UDP headers contiguously located in the buffer, which can be processed in part by hardware. Once the logic within network interface card 202 or the CPUs 208 complete processing on a received packet, the packet can be transferred to the operating system 210 for further processing in some examples.

In the illustrated example, a driver 212 transfers the data packet from the network interface card 202 and stores the data packet in a location at which the operating system 210 has access to the packet. In one example, the received data packet is transferred to a buffer within an operating system memory of the computer 200. Thus, the driver 212 controls the network interface card 202. The driver 212 moves data packets received by the network interface card 202 into a buffer managed by the operating system of the computer 200. Each successive layer within the network stack then processes the data packet by reading and/or modifying this buffer. As each layer finishes processing, the layer signals the next layer to begin processing. In the illustrated embodiments, the ETH processing module 214 processes the packet to determine compliance with the requirements of the ethernet protocol layer, an IP processing module 216 processes the packet to determine compliance with the requirements of the IP protocol layer, a UDP processing module 218 processes the packet to determine compliance with the requirements of UDP, and a QUIC processing module 220 processes the packet to determine compliance with the requirements of QUIC. It should be appreciated that other checks may be performed, such as checking a packet to determine whether the packet has a header indicating that the packet was sent from a IP-address that is a permitted source of packets and/or whether the data packet was send using the QUIC transport protocol. Other similar checks may be performed to determine whether a received packet complies with requirements of a layered protocol.

In one example, at each step in the processing, a determination is made whether the packet complies with the requirements of a specific protocol in the layered protocol. If the processing determines that the packet does not comply with the requirements of the protocol, the packet may be discarded. Alternatively, error detection or error recovery steps may be performed. However, if compliance with all protocol layers is validated, the data from the packet may be passed on to an application within the computer 200 or otherwise utilized. In the example of FIG. 2, the UDP protocol layer is the last layer for which validation is performed and data is passed to an application when processing in accordance with UDP is completed.

Figure 3:
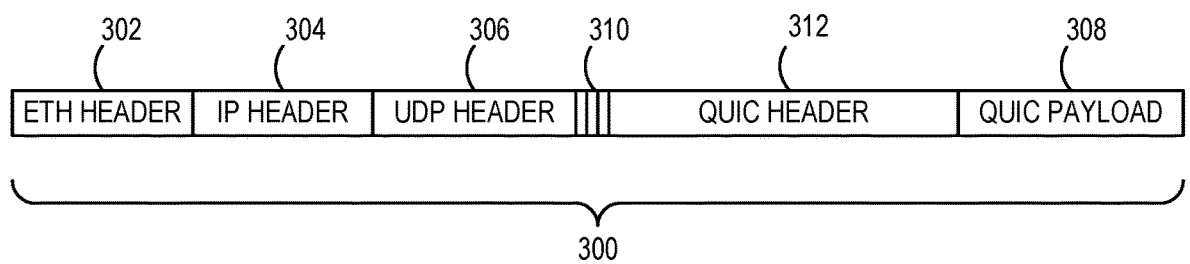
FIG. 3 is an exemplary block diagram of a data structure according to an embodiment.

FIG. 3 illustrates an example of a data structure 300 (defining a data packet) that may exist in the memory of the computer 200 following receipt of a data received packet by the network interface card 202. The data structure 300 includes fields that store information used for processing the packet. In this example, the data structure 300 generally includes an Ethernet header 302, an IP header 304, a UDP header 306 and a body defined by a QUIC payload 308. As should be appreciated, the QUIC payload is encrypted.

Additionally, in the illustrated example, the data structure 300 includes an authenticated data portion, illustrated as a QUIC plaintext 310 (an unencrypted portion), as well a QUIC header 312. The QUIC plaintext portion 310 is a portion of the header that is visible to the network, while the QUIC payload 308 is not visible to the network. In various embodiments, the QUIC packet header (i.e., QUIC header 312) is always unencrypted. The remainder of the packet is the encrypted payload. Inside the packet payload, there are one or more frames, each with a header and optionally a payload. In various examples, the key used for the encryption depends on the type of packet header (static version specific for 'cleartext' long headers, TLS determined for short headers and 0-RTT for long headers).

Figure 4:
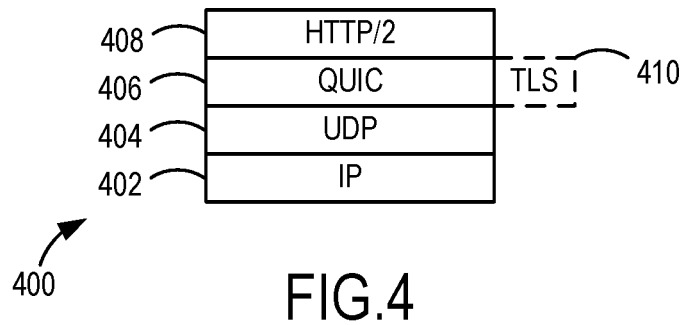
FIG. 4 is an exemplary protocol stack according to an embodiment.

Various examples use information within the data structure 300 to perform hardware offloading, which includes having a single call to perform the offloaded functions. In QUIC, encryption is performed at the transport layer and an example protocol stack 400 is illustrated in FIG. 4. The stack 400 includes an IP layer 402, a UDP layer 404, a QUIC layer 406 and an HTTP/2 layer 408, in that order. It should be noted that transport layer security (TLS) 410 is also provided, which in one example is included as part of the QUIC layer 406. As should be appreciated, QUIC makes the HTTP 2 layer smaller and subsumes some of the functionality of HTTP 2, TCP and TLS within the QUIC layer 406, including stream multiplexing and prioritization. Moreover, because encryption is performed at the transport layer, the QUIC headers are encrypted as data packets are transmitted across the network using UDP. The QUIC transport protocol thereby provides an end-to-end secure protocol. It should be noted that in some examples, QUIC over HTTP 1 is used.

Thus, QUIC runs on top of UDP sockets and in various examples uses TLS 1.3 for encrypting data. QUIC also uses specific headers and subsumes some parts of HTTP/2. According to various examples as described in more detail herein, QUIC delivers TCP-like reliability, while supporting 0-RTT and stream multiplexing, and is tamper proof and secure.

In one example, a set of operations are performed in hardware instead of software. In particular, RSS, LSO, RSC and crypto offload are all performed in hardware instead of in software in some examples, each of which will be described below.

RSS Hardware Offload

Figure 5:
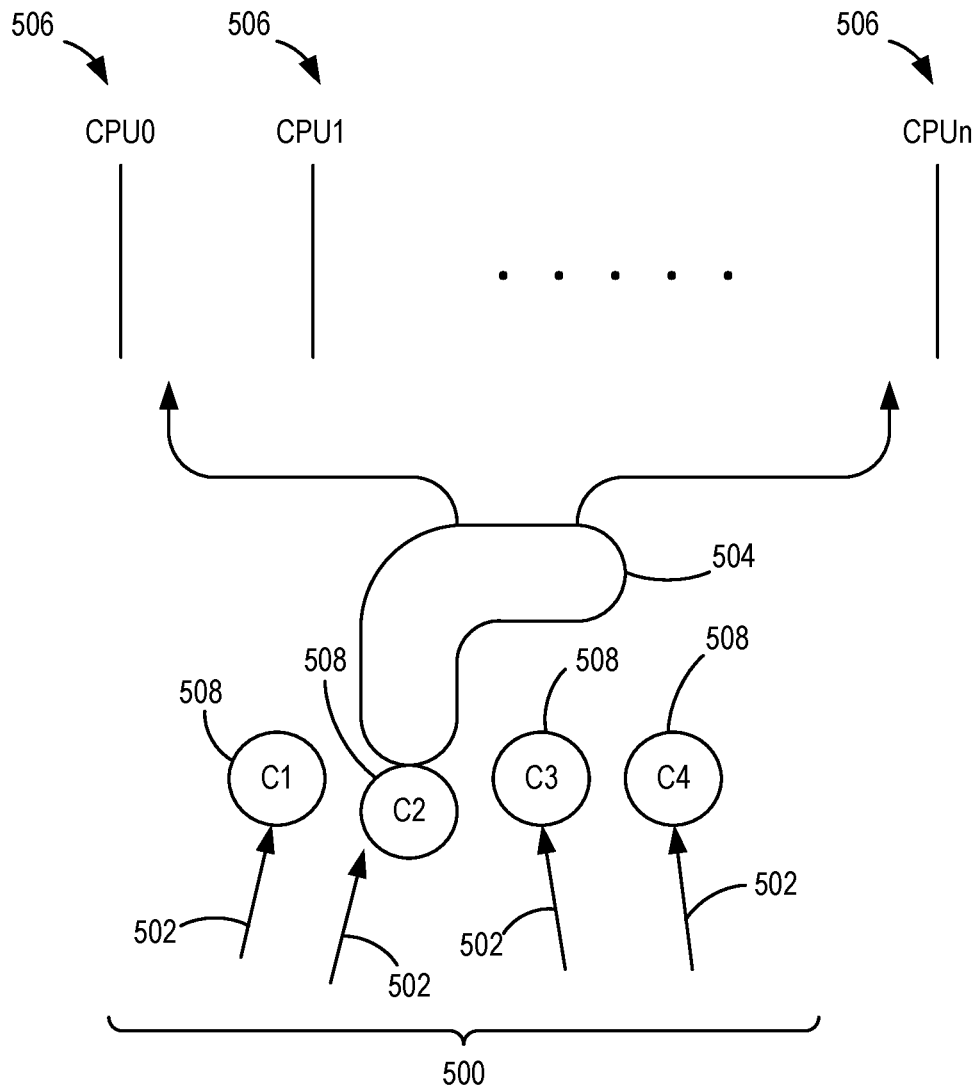
FIG. 5 is an exemplary diagram illustrating spreading of data packets for processing according to an embodiment.

More particularly, with respect to RSS and as illustrated in FIG. 5, data traffic 500 comes in (i.e., is received) on different connections 502 to different connection sockets 508. However, in some examples, such as when a particular socket is identified with a specific CID, all of a data stream being transmitted is received through a single socket 508 (i.e., because a single object is defined for a particular port, multiple streams of data or a large amount of data packets can be received at the single port). This data traffic is spread across multiple CPUs 506, such as by hardware operations performed in a network interface card 504, which may be embodied as the network interface card 202 (illustrated in FIG. 2). In one example, the network interface card 504 uses the CID or the CID and a 4-tuple value of data packet IP address as an identifier.

Figure 8:
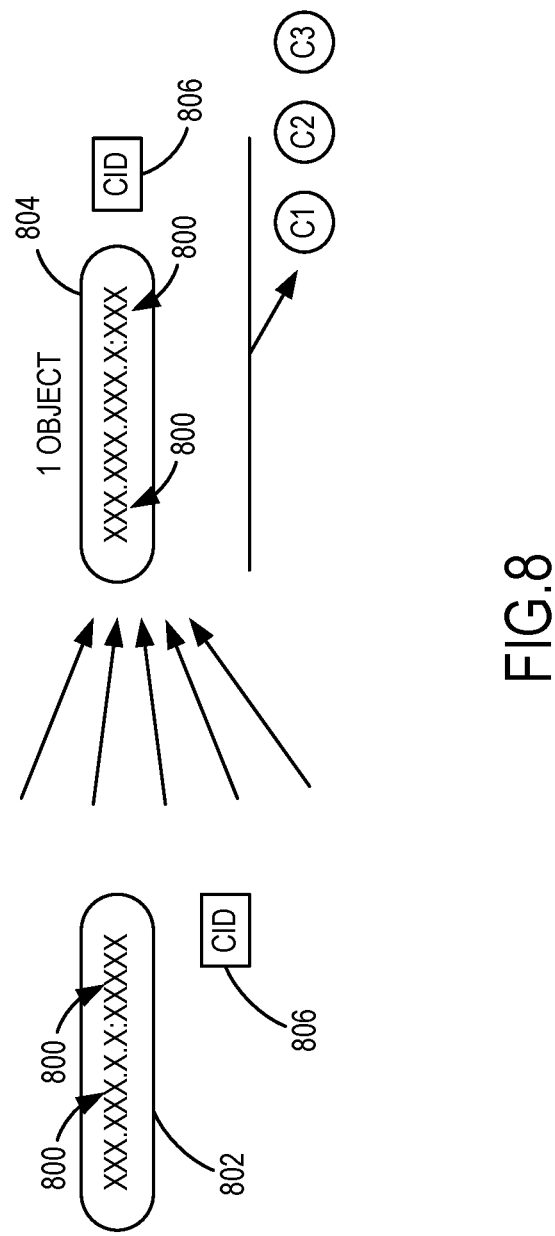
FIG. 8 is an exemplary diagram illustrating Internet Protocol (IP) addresses with a 4-tuple defined according to an embodiment.

One example of a defined 4-tuple is shown in FIG. 8. The 4-tuple is defined by values at predefined address positions 800 within the source IP address 802 and the destination IP address 804, and in some examples, is used in combination with a CID 806 (located within the QUIC plaintext portion 310 of the data structure 300 shown in FIG. 3) for hashing operations. However, in some examples, the CID 806 is the sole value used for hashing operations or other control operations.

The values represent a key used to spread the traffic across the CPUs 506. For example, the CID or the 4-tuple in combination with the CID is used as an identifier to seed to a hashing algorithm to select a CPU 506 for output of data packets thereto. Thus, the network interface card 504 uses either the CID or a combination of the CID and the 4-tuple to generate a value using the hashing algorithm, which will then be used to spread data packets across the CPUs 506 (e.g., to select specific CPUs for processing certain data packets). Thus, in some examples, only the CID is used. However, in other examples, such as when using multiple servers, the CID is used in combination with the 4-tuple. In still other examples, the CID is used in combination with a 2-tuple.

In some examples, a QUIC stream ID may be used to perform the hash (after decrypting the QUIC packet) and generate a value to spread the packets across the CPUs 506. In this case, instead of each packet being sent to a CPU 506 corresponding to the hashed value, a data stream is sent instead. It should be noted that the stream ID is located in the encrypted portion of the data structure 300 shown in FIG. 3 (that includes the cyphertext and the stream ID). Each stream in some examples is a different data stream, such as different video streams, such that each video stream is processed by a different CPU 506.

Thus, in operation, the hashing algorithm uses the CID D value or the 4-tuple value in combination with the CID value to generate a value representative of the CPU 508 to which the data packet should be sent for processing. For example, the hashing algorithm uses a hash table (e.g., hash map) that maps keys (defined by the CID or the CID+4-tuple value) to values for selecting CPUs 508 for data packet processing. In one example, the hash table uses hash functionality technology to compute an index into an array of buckets or slots, from which the output value is determined.

It should be noted that in some examples, the hardware offload is performed using a 2-tuple instead of a 4-tuple. It also should be noted that using the CID provides a fail over in the event of a failure. For example, if a connection fails over, different 4-tuple information is used, but the CID remains the same, thereby providing consistent hashing.

Thus, various examples perform RSS using QUIC header fields. QUIC headers include QUIC specific fields, such as the CID and stream ID used to more effectively spread traffic on the host between CPUs as described herein. The CID field in QUIC also allows for the connection to migrate from one network to the other. For example, if the client roams from a Wi-Fi network to a cellular network, then the CID allows the client and server to preserve the connection even if the local IP address and port change, which is not possible with TCP. The Stream ID field also allows QUIC to multiplex multiple streams in the same connection. If RSS is performed using the stream ID, a single QUIC connection can be processed on multiple cores and single connection performance is able to be scaled. It should be noted that because the CID field is present without decryption, RSS does not depend on crypto offload when using the CID field. However, the Stream ID is in the encrypted portion, so RSS on this field includes decryption and hence depends on crypto offload.

Crypto Hardware Offload

Regarding crypto offload, various examples perform a stateful offload, wherein the CID and the 4-tuple is associated with a symmetric key and a crypto algorithm. Thus, instead of using asymmetric cryptography (such as a Rivest-Shamir-Adleman (RSA) public-key cryptosystem), wherein an asymmetry key is generated, a symmetric crypto (e.g., Advanced Encryption Standard (AES), Galois/Counter Mode (GCM) or ChaCha/Poly crypto) is performed and offloaded to hardware, such as to the network interface card 504. In one example, AES-GCM functionality is offloaded to the network interface card 504 to be completed in hardware.

In particular, with respect to the stateful offload, in one example, the following is performed:

1. Programming portion (performed at connection establishment): send mapping between (CID, 4-tuple) and (symmetric crypto key, crypto algorithm) to hardware so that the hardware (e.g., network interface card 504) is ready to parse packets on receipt. For example, apriori programming of the network interface card 504 is performed such that the key and algorithm is handed off to the hardware. This provides stateful (flow identification) information, particularly for the receive side. It should be noted that the packet number is provided as part of the encryption and/or decryption.

2. Send portion, wherein encryption is performed. That is, during the send operation, a call is issued to perform encryption. If encryption fails, the send call fails and the encryption is attempted in software in some examples. In some examples. If the encryption fails, the packet is dropped. For example, if the encryption fails, the send fails. However, if the encryption failed because of general connection wide state issues, then a separate upcall is indicated to the operating system.

3. Receive portion, wherein decryption is performed. The CID or the CID and 4-tuple from the data packet is obtained (which as described herein is in an unencrypted portion of the data packet), and then a lookup operation is performed to determine the symmetric key and crypto algorithm. If the lookup fails, the packet is indicated 'as-is'. If the lookup is successful, the data packet is then decrypted using a decryption process, such as based on AES-GCM technology. If decryption fails, an error code is generated, and the data packet is indicated as being in an as-is condition. Thereafter, the decryption of the data packet is attempted in software.

Thus, hardware, which is this example is the network interface card 504, is programmed up-front (instead of being performed in software), which is after the initial connection handshake is performed in some examples. If the network interface card 504 supports a given QUIC version number, in various examples, the network interface card 504 supports encrypting/decrypting the handshake packets, which are encrypted with a static, version specific key. This is independent of the specific connection the packet applied to.

In one example, once connection is established, the network interface card 504 is programmed as described above (i.e., the programming portion). In QUIC, unlike TCP, each packet is a TLS packet, such that each packet is decryptable on its own (e.g., decryptable on the fly). As a result of the crypto offload, various examples are able to perform the software offload of the RSS, LSO and RSC operations as described herein. Thus, in QUIC, the TLS record is exactly the same size as the QUIC packet. As such, even if packets are reordered, the packets can be decrypted independently. The hardware can decrypt on the fly, with the data packets are later reassembled. In TCP, the data packets can arrive out of order and, thus, sequence number tracking and buffering of packets would need to be performed.

Variations and modifications are contemplated by the present disclosure. For example, on the send side, instead of encrypting a portion of the QUIC packet in software, the portion can be provided in cleartext (i.e., non-encrypted data) and sent to hardware. In this case, the network interface card 504 performs packet segmentation and encrypts the individual segmented packets. Thus, in addition to having only one call to send a data packet, encryption does not have to be performed.

As should be appreciated, the crypto offload is a stateful offload. In operation, in one example, when the network interface card 504 binds to the network stack (e.g., the stack 400), the network interface card 504 advertises all the TLS cypher suites that the network interface card 504 supports. The network interface card 504 also advertises the maximum number of connections the network interface card 504 can support for crypto offload. The cypher suite in one example is a combination of authentication algorithms and encryption algorithms. As a particular example, the network interface card 504 advertises support for AES GCM 256, AES GCM 128, ChaCha-poly and SHA-256 algorithms. The network stack then has the information to decide if a connection can be offloaded to the hardware using a subset of the crypto algorithms.

In one example, once a QUIC connection is established and 1-rtt (symmetric crypto) key has been negotiated (e.g., using TLS 1.3), the network stack offloads the information about the QUIC connection to the network interface card 504THe following details are programmed in one example:

1. Connection 4-tuple;
2. CID;
3. TLS 1-rtt key;
4. Cypher suite information (authentication and encryption algorithm); and
5. The latest QUIC connection Packet Number.

It should be noted that in some examples, 0-RTT crypto offload similarly is provided.

The network stack keeps track of how many connections have been offloaded for crypto. If the number of offloaded connections is less than a maximum value, a new connection can be offloaded to the network interface card 504 by programming the information in the list above.

Once the connection is offloaded, all subsequent sent and received packets for this connection are encrypted and authenticated in hardware. This process saves CPU cycles. The packets are then processed as plain text in the network stack.

The network interface card 504 will also keep track of the latest packet number processed on transmit and receive operations so the network interface card 504 can correctly encode/decode the packet number and use the number as part of encryption/decryption.

Similar to offload, any connection can be "uploaded" (i.e., revoked from hardware offload) by the network stack at any time. For example, if the connection is closed for any reason or the connection migrates, then the network stack can upload the connection by specifying the following details:

1. Connection 4-tuple; and
2. CID.

It should be appreciated that that the crypto offload can run the portion of the network driver that uses the symmetric key in a secure virtualization enclave (e.g., VSM virtual secure mode). This process supports scenarios that do not trust the network driver code to give access to the encryption keys.

Optionally the network interface card 504 can also decrypt the connection handshake and stateless reset packets using static keys that are QUIC version specific. In one example, the connection handshake uses static version specific keys that the network stack can program to the driver. Similarly, for an offloaded connection that has closed locally, the network stack can program the key for generating a stateless reset packet in response to any received packet for the matching connection. The network stack then uploads the connection after the duration for which the stack needs the hardware to keep generating stateless reset packets.

It also should be appreciated that various examples provide version support advertisement and enablement. For example, when the network interface card 504 binds to the network stack, the network interface card 504 advertises all the QUIC versions the network interface card 504 supports in the format, a set of ranges and specific values. For example, if the network interface card 504 supports versions 1, 3, 4, 5, 6, 7 and 11, the network interface card 504 advertises 1, 3-7, 11. Depending on the operating system configuration and network stack version, the operating system programs a subset of versions to offload. As one example, the network stack could only require support for the latest version 11 so the network stack enables offload of version 11 on the network interface card 504. If the network interface card 504 receives or sends any QUIC version other than the ones enabled, no offloads are performed, and the packets are passed unmodified in both directions (send and receive).

LSO and RSC Hardware Offload

Figure 6:
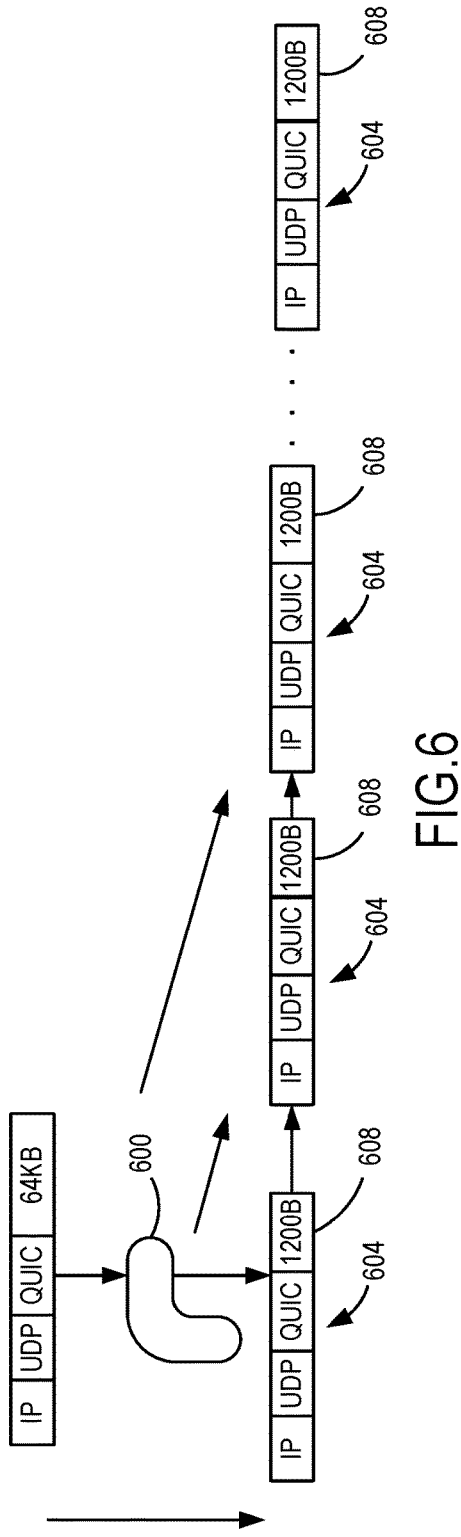
FIG. 6 is an exemplary diagram illustrating a data packet chopping operation according to an embodiment.
Figure 7:
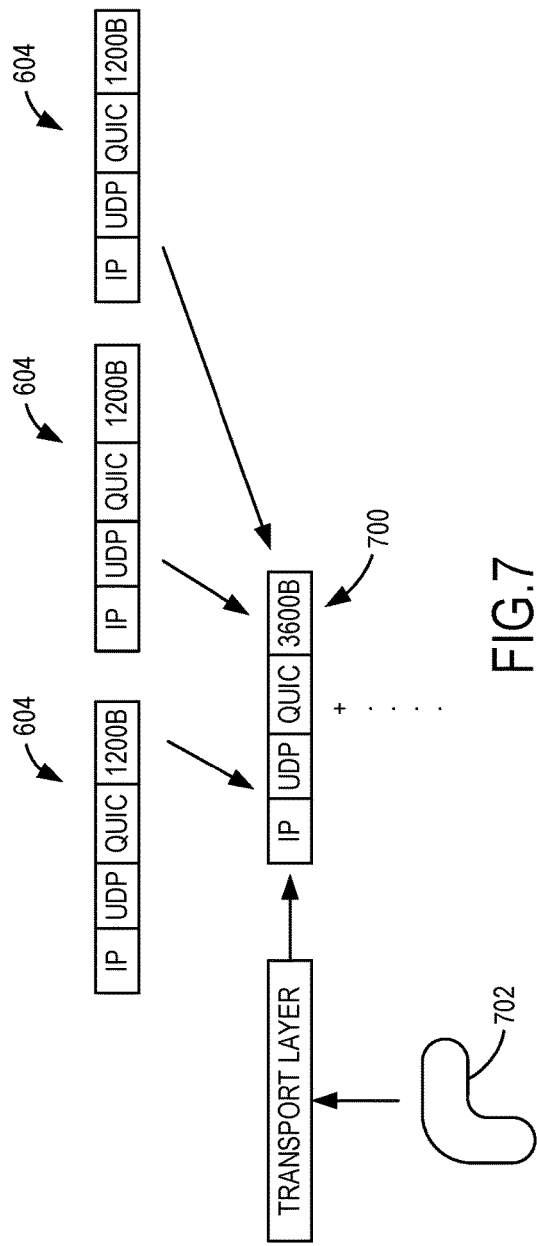
FIG. 7 is an exemplary diagram illustrating a data packet assembling operation according to an embodiment.

FIG. 6 illustrates a batch application programming interface (API) for LSO and FIG. 7 illustrate an RSC combining process for QUIC that can be performed when the above-described crypto offload is performed. In particular, a network interface card 600 performs a chopping operation on a data packet 602 that chops the data packet 602 into a plurality of smaller data packets 604 when the data packet 602 is too large to be sent over the network (e.g., exceeds the maximum data packet size configured by the operating system, such that the operation system performs the path maximum transmission unit (PMTU) discovery). Each of the data packets 604 are individually encrypted before being transmitted. This can be performed because the crypto offload allows the network interface card 600 to access the payload portion 606 of the data packet 602 and split/chop the payload portion 606 into smaller payload portions 608 in the data packets 604 (e.g., 64 kB into 1200-byte data packets).

The chopping is performed based on a single call to the network interface card 600 to generate the data packets 604, instead of separate calls to generate each data packet 604. A single large packet is thus sent to the network interface card 600, such that hardware generates the individual data packets 604 from the data packet 602. As such, with the crypto offload, various examples perform LSO to split up (chop) QUIC packets on transmit using a batch API process.

It should be noted that the LSO offload is dependent on the QUIC crypto offload in various examples. Bulk connections transmit a lot of QUIC packets with just one frame type: the stream which describes a set of contiguous bytes for a stream. On the transmit path, crypto offload allows the network stack to generate a large plaintext QUIC packet (larger than maximum transmission unit (MTU) size) with just the stream frame. Hence this offload is effectively a Large Stream Send Offload. The out-of-band (OOB) information in various examples includes the MTU size that the packet needs to be segmented into and the packet number to be used for the first generated packet.

Thus, in operation, the network interface card 600 segments the QUIC packet into smaller MTU sized packets (and optionally one smaller than MTU sized packet) and then performs the encryption as part of the crypto offload for each smaller packet. Hence, on the receiver, the packets will show up as the packets would have been generated in the absence of QUIC offloads. The network stack is, thus, able to compute how many packets will be generated and can increment the packet number to be used for further packets correctly. In various examples, LSO offload allows QUIC to match TCP performance on transmit for bulk transfer connections.

It should be noted that checksums are performed in various examples in hardware. For example, the operating system network stack can offload checksum on transmit by setting OOB information on a given packet. On receive, the network interface card 600 validates the checksum and sets the OOB information on whether the checksum is valid or not. This saves CPU processing time and improves performance.

Regarding RSC, various examples combine QUIC packets on receive. For example, on the receive side, QUIC data packets are combinable into a single packet, in clear text, and then provided to a receive side application. For example, as shown in FIG. 7, the individual data packets 604 (that were chopped) are combined into a single data packet 700 by a network interface card 702, which can be performed as result of the crypto offload. Similar to the send batch operation, the receive batch operation is performed based on a single call to the network interface card 702 (and knowing the packet numbers of the packets received to send an acknowledgement), such that the network interface card 702 confirms that the data packets 604 are QUIC data packets and that the data flow has been offloaded to the network interface card 702. The data packets 604 are then decrypted by the network interface card 702 and reassembled into the single data packet 700. It should be noted that the network interface card 702 in some examples performs the herein described RS S operation after performing the RSC operation. Again, as should be appreciated, because decryption has already occurred as a result of the crypto offload, the network interface card 702 is able to perform the RSC operation. The resulting packet 700 is a plain text packet that can be transmitted for further processing or for execution.

It should be noted that the RSC offload is dependent on the QUIC crypto offload. Thus, if a connection is offloaded to the hardware and the packets for the connection are received by the network interface card 702, the network interface card 702 will first perform a decryption operation on MTU (or smaller than MTU) packets. Thereafter, since the packets are plaintext and all header information is available, the network interface card 702 combines successive QUIC packets (packet numbers in sequence order) that only have a stream frame and stream sequence numbers that are also contiguous. Such a combined QUIC packet can then be indicated in plaintext to the network stack, which can process one packet with more data, instead of multiple packets, hence reducing CPU usage. The RSC offload operation in various examples allows QUIC to match TCP performance on receive for bulk transfer connections.

Figure 9:
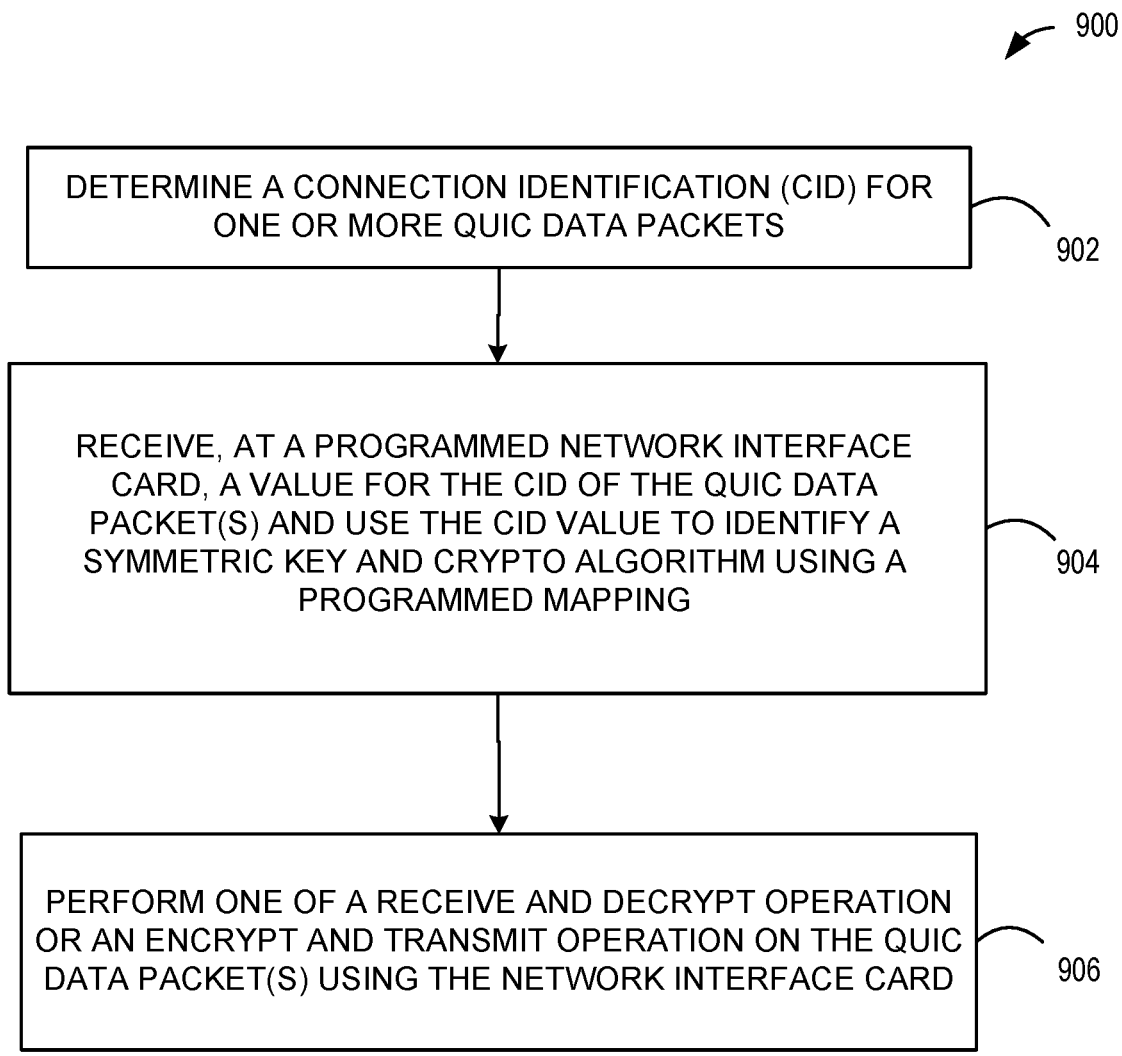
FIG. 9 is an exemplary flow chart illustrating operations for a hardware offload process according to an embodiment.

FIG. 9 illustrates an exemplary flow chart of a method 900 for QUIC hardware offload. In particular, this figure is an exemplary flow chart illustrating operations of a computing device to perform a stateful offload of data packet processing functions to hardware. The operations illustrated in the flow charts described herein may be performed in a different order than is shown, may include additional or fewer steps and may be modified as desired or needed. Additionally, one or more operations may be performed simultaneously, concurrently or sequentially.

In particular, at 902, the computing device, which includes or is coupled to at least one network interface card, is configured to determine the CID for one or more QUIC data packets. For example, as described herein, the CID can be obtained from the QUIC plaintext portion of the QUIC data packet, which is an unencrypted portion. The CID is information provided as part of the QUIC data packet that identifies uniquely the connection being used for communication of the QUIC data packet. It should be noted that in some examples, additional packet information for the QUIC data packet may be obtained, such as a 4-tuple corresponding to the source and destination IP address for the QUIC data packet.

At 904, a programmed network interface card (e.g., a preprogrammed network interface card) of the computing device receives a value for the CID of the QUIC data packet(s) and uses the value to identify a symmetric key and crypto algorithm using a programmed mapping (e.g., a preprogrammed mapping). In one example, a mapping is sent to the network interface card during a programming portion of a stateful offload. The mapping is between (CID, 4-tuple) and (symmetric key, crypto algorithm), which is sent to hardware so that the network interface card is ready to parse the QUIC data packets on receipt. This operation hands off the crypto key and crypto algorithm to the hardware of the network interface card that defines a crypto offload to hardware. In some example, the mapping is between (i) connection information, including the CID, the local IP address and the UDP port and (ii) the symmetric key and the crypto algorithm.

At 906, the hardware of the network interface card performs one of a receive and decrypt operation or an encrypt and transmit operation on the one or more QUIC data packets using the independent symmetric key and crypto algorithm. For example, with the crypto offload performed, a hardware RSS, LSO or RSC can be performed on the one or more QUIC data packets in combination with a transmit operation or a receive operation. Encryption or decryption is can be performed on smaller individual packets in some examples before transmission or after reception as described herein. As should be appreciated, each of the smaller individual packets is a TLS record.

Figure 10:
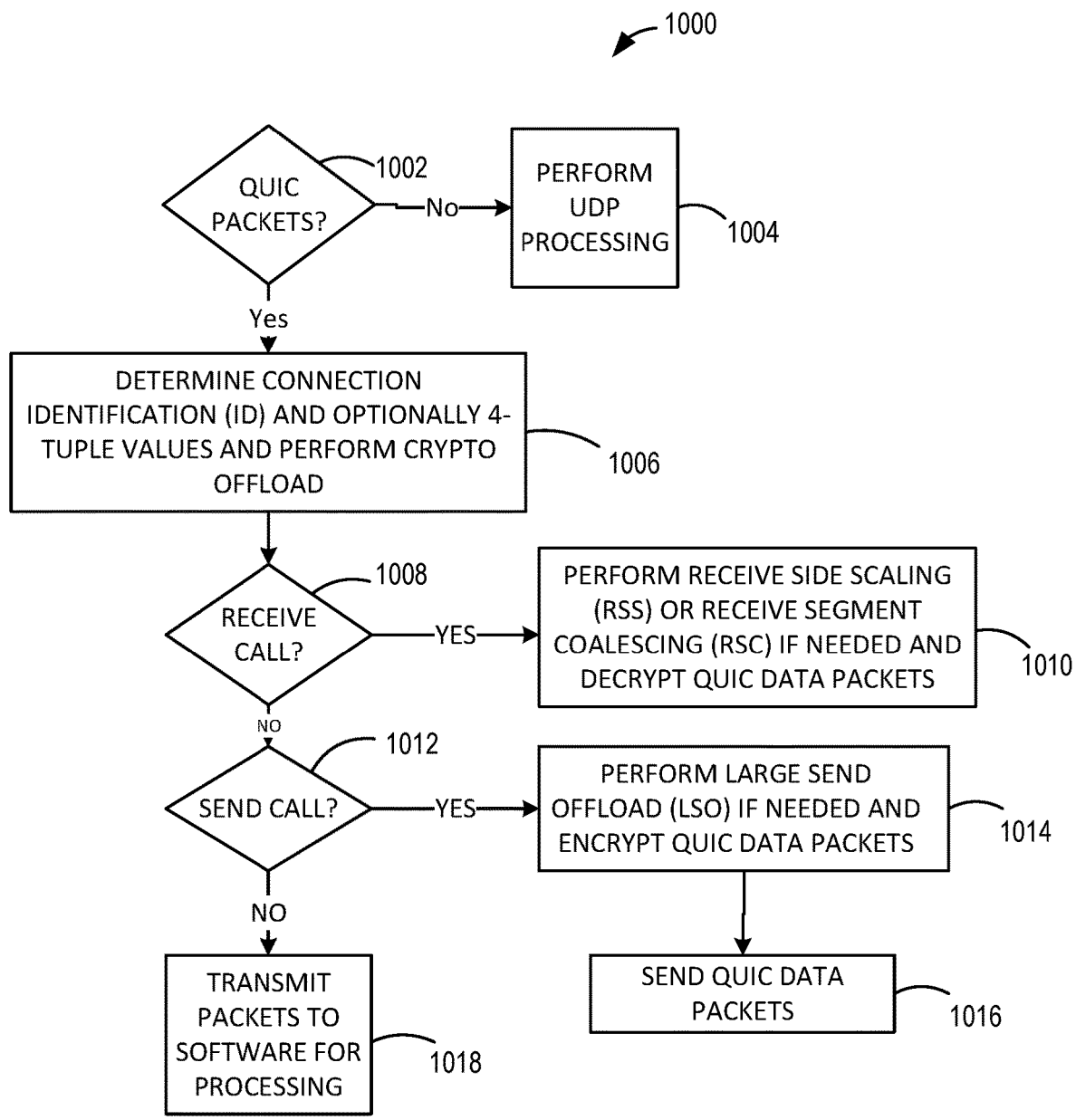
FIG. 10 is exemplary flow chart illustrating operations for performing hardware offload functions according to an embodiment.

FIG. 10 illustrates an exemplary flow chart of a method 1000 for performing specific QUIC hardware offload functions. In particular, this figure is an exemplary flow chart illustrating operations of a computing device to perform software functions in hardware, particularly using a network interface card. At 1002, the computing device determines whether the data packets to be processed are QUIC data packets. For example, a version specific QUIC verification process can be used to identify whether the data packets include QUIC data headers. It should be noted that any suitable process may be used within the QUIC protocol to determine whether the packets comply with the QUIC protocol.

If a determination is made at 1002 that the packets are not QUIC packets, the packets are determined to be UDP packets and processed using UDP processing techniques. It should be noted that the UDP processing may be performed in software or in hardware.

If a determination is made at 1002 that the packets are QUIC packets, the computing device determines the CID and optionally the 4-tuple values of the source and destination IP addresses of the QUIC data packets. This information defines QUIC packet information used for a crypto offload. In one example, the value of at least the CID is used to perform a crypto offload, such as by associating the CID and optionally the 4-tuple values with a symmetric key and crypto algorithm programmed in the network interface card. Thus, a symmetric crypto (encryption/decryption) operation is performed in hardware instead of in software (such as is performed in TCP processing, for example, at 1004).

A determination is made at 1008 whether a receive call is received by the network interface card. If a receive call is issued, an RSS operation and/or an RSC operation are performed at 1010, if needed, and as part of decrypting the QUIC data packets. It should be noted that the decryption is first performed in various examples before the RSS operation or RSC operation is performed. In one example, a receive call indicating the socket as batched, results in the RSC operation combining received QUIC packets into a larger packet as described herein. It should be noted that each of the smaller received QUIC packets are individually decrypted by the network interface card, which are then reassembled. Additionally, RSS may be performed to send the smaller packets to different CPUs for processing in some examples and for larger coalesced packets depending on the processing pipeline of the hardware. For example, so as to not hit a scale limit for the network interface card that could otherwise occur because all of the packets would be sent to a single CPU due to the QUIC transfer protocol, the incoming data packets are sent to different CPUs for processing such as by hashing the CID or by hashing a combination of the CID and the 4-tuple to determine a CPU to use for processing. Thus, multiple CPUs are used in some embodiments for the hardware decrypting of the QUIC data packets, which are then combined in hardware, such as using the RSC operation. Accordingly, the network interface card receives smaller QUIC data packets and assembles or recreates a single larger data packet. The RSC operation is essentially the reverse of the LSO operation, which are both performed in hardware by the present disclosure.

It should be appreciated that in some examples a stream ID is used instead of the CID as described herein. For example, the stream ID is used to perform the hashing (after decrypting the QUIC data packet) and is used to spread the data streams (instead of data packets) for processing among the multiple CPUs.

If a determination is made at 1008 that no receive call was made, then a determination is made a 1012 whether a send call has been made. If a send call has been made, then at 1014 the network interface card performs an LSO operation, as needed, and then encrypts the QUIC data packets for transmission. For example, a single call to UDP is made that results in splitting/chopping a larger data packet into smaller data packets before encryption and transmission as UDP QUIC packets at 1016.

With QUIC, each of the smaller data packets is individually encrypted based on the single call to UDP. It should be appreciated that the splitting/chopping operation to generate smaller packets does not use IP fragmentation, but instead chops the larger packet into smaller predefined sized packets (e.g., predetermined byte size packets). That is, the hardware can take large packets on transmit and chop the packets up, such that after encryption the packets are MTU sized UDP QUIC packets, and on receive decrypt the MTU sized UDP packets and then coalesce the packets into one large plaintext packet.

If a determination is made at 1012 that a send call was not made, then the one or more packets are transmitted to software for processing at 1018. In some examples, if the crypto offload fails or if the encrypt or decrypt operation fails, such as if the send or receive call fails (which is equivalent to no send or receive call being made), an error code is generated. Additionally, as part of the fail over, in which the packet is indicated as an "as-is" packet, the operation in then performed in software.

Thus, the present disclosure provides effective and efficient packet processing using a hardware offload. The processing in hardware is programmed to perform operations that otherwise are performed in software.

Various examples are able to advertise QUIC versions supported by the network interface card hardware and then the network stack programs the subset of versions needed for QUIC offload. The network interface card also advertises all the TLS cypher suites that the network interface card supports for encryption and authentication.

In various examples, TLS crypto operations like symmetric key encryption and authentication for QUIC connections are offloaded to the network interface card hardware by programming the mapping of "connection information→{symmetric key, crypto algorithms}. Also, various examples allow for the upload (or terminate/revoke) of the offloaded connection.

In some examples, security technology like VSM can be used for cases where the network interface card driver cannot be trusted with the symmetric key. As such, the portion of the network driver code that needs to access the key is run in the enclave protected by virtualization technology.

Various examples leverage crypto offload to achieve bulk performance offloads like LSO and RSC (i.e., because the network interface card processes QUIC plaintext packets, the network interface card can properly segment one large QUIC packet into smaller MTU sized packets on transmit, and combine multiple smaller packets into one large packet on receive). In some examples, LSO and RSC is supported for packets with just the stream frame type (i.e. data packets).

Various examples also perform RSS based on QUIC header fields (some in clear text and some encrypted) to achieve a more fine-grained spreading of traffic.

Exemplary Operating Environment

Figure 11:
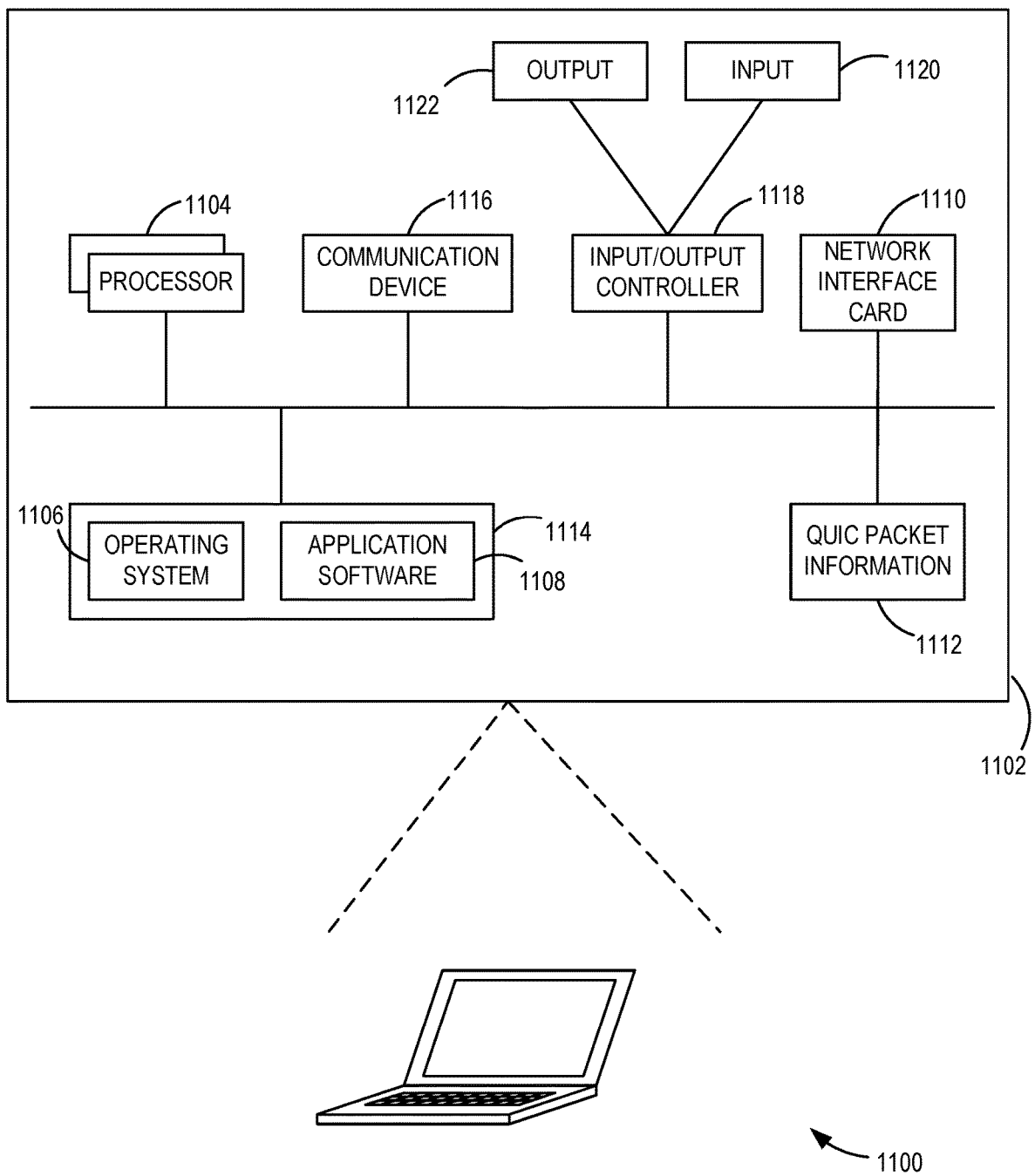
FIG. 11 illustrates a computing apparatus according to an embodiment as a functional block diagram.

The present disclosure is operable with a computing apparatus 1102 according to an embodiment as a functional block diagram 1100 in FIG. 11. In one example, components of the computing apparatus 1102 may be implemented as a part of an electronic device according to one or more embodiments described in this specification. The computing apparatus 1102 comprises one or more processors 1104 which may be microprocessors, controllers or any other suitable type of processors for processing computer executable instructions to control the operation of the electronic device. Platform software comprising an operating system 1106 or any other suitable platform software may be provided on the apparatus 1102 to enable application software 1108 to be executed on the device. According to an embodiment, QUIC hardware offloading is performed by a network interface card 1110 using QUIC packet information 1112 (e.g., a CID value) instead of being accomplished by software.

Computer executable instructions may be provided using any computer-readable media that are accessible by the computing apparatus 1102. Computer-readable media may include, for example, computer storage media such as a memory 1114 and communications media. Computer storage media, such as the memory 1114, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1114) is shown within the computing apparatus 1102, it will be appreciated by a person skilled in the art, that the storage may be distributed or located remotely and accessed via a network or other communication link (e.g. using a communication device 1116).

The computing apparatus 1102 may comprise an input/output controller 1118 configured to output information to one or more input devices 1120 and output devices 1122, for example a display or a speaker, which may be separate from or integral to the electronic device. The input/output controller 1118 may also be configured to receive and process an input from the one or more input devices 1120, for example, a keyboard, a microphone or a touchpad. In one embodiment, the output device 1122 may also act as the input device 1120. An example of such a device may be a touch sensitive display. The input/output controller 1118 may also output data to devices other than the output device 1122, e.g. a locally connected printing device. In some embodiments, a user may provide input to the input device(s) 1120 and/or receive output from the output device(s) 1122.

In some examples, the computing apparatus 1102 detects voice input, user gestures or other user actions and provides a natural user interface (NUI). This user input may be used to author electronic ink, view content, select ink controls, play videos with electronic ink overlays and for other purposes. The input/output controller 1118 outputs data to devices other than a display device in some examples, e.g. a locally connected printing device.

The functionality described herein can be performed, at least in part, by one or more hardware logic components. According to an embodiment, the computing apparatus 1102 is configured by the program code when executed by the processor(s) 1104 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for hardware offloading, the system comprising:
at least one processor;
a network interface card; and
at least one memory comprising computer program code, the at least one memory and the computer program code configured to, with the at least one processor, cause the at least one processor to:
program the network interface card with a mapping between (i) a connection identification (CID) for one or more Quick User Datagram Protocol Internet Connections (QUIC) data packets and (ii) a symmetric key and a crypto algorithm,
receive one or more data packets over a network,
parse the one or more data packets to identify the one or more data packets as QUIC data packets and then obtain the CID for the QUIC data packets, and
send the CID to the network interface card, wherein the network interface card is configured to identify the symmetric key and the crypto algorithm based on the CID to perform a crypto decrypt operation on the QUIC data packets, and reassemble the QUIC data packets; and
receive the reassembled QUIC packets from the network interface card.

The system described above, wherein the network interface card is configured to use the CID to perform a receive side scaling (RSS) operation.

The system described above, wherein the network interface card is configured to use the CID to perform a receive segment coalescing (RSC) operation.

The system described above, wherein the computer program code is further configured to, with the at least one processor, cause the at least one processor to send one or more packets to be transmitted over the network to the network interface card, wherein the network interface card is further configured to:
identify the symmetric key and the crypto algorithm based on the CID to perform a crypto encrypt operation on the one or more data packets, and
transmit the encrypted one or more data packets as QUIC data packets.

The system described above, wherein the network interface card is configured to use the CID to perform a large send offload (LSO) operation.

The system described above, wherein the network interface card is configured to chop up the one or more QUIC data packets using a process that does not result in IP fragmentation.

The system described above, wherein the wherein the computer program code is further configured to, with the at least one processor, cause the at least one processor to offload one of an Advanced Encryption Standard (AES), Galois/Counter Mode (GCM) or ChaCha/Poly crypto to the network interface card as part of a crypto offload.

The system described above wherein the network interface card is configured to use the CID and a 4-tuple of source and destination addresses to perform the crypto decrypt operation.

A computerized method for hardware offloading, the computerized method comprising:

programing a network interface card with a mapping between (i) a connection identification (CID) for one or more Quick User Datagram Protocol Internet Connections (QUIC) data packets and (ii) a symmetric key and a crypto algorithm; and identifying the CID for one or more QUIC data packets and sending the CID to the network interface card, wherein the network interface card is configured to perform one of (i) receiving and decrypting the one or more QUIC data packets over a network or (ii) encrypting and transmitting the one or more data QUIC packets over the network, the symmetric key and the crypto algorithm for the decryption or encryption being identified by the network interface card based on the CID for the one or more QUIC data packets.

The computerized method described above, further comprising performing, by the network interface card, a receive side scaling (RSS) operation using the CID when receiving the one or more QUIC data packets.

The computerized method described above, further comprising performing, by the network interface card, a receive a segment coalescing (RSC) operation using the CID when receiving the one or more QUIC data packets.

The computerized method described above, further comprising performing, by the network interface card, a large send offload (LSO) operation using the CID when transmitting the one or more QUIC data packets.

The computerized method described above, further comprising performing, by the network interface card, chopping up the one or more QUIC data packets, using a process that does not result in IP fragmentation, before transmitting the one or more QUIC data packets.

The computerized method described above, further comprising offloading one of an Advanced Encryption Standard (AES), Galois/Counter Mode (GCM) or ChaCha/Poly crypto to the network interface card as part of a crypto offload.

The computerized method described above, further comprising using the CID and a 4-tuple of source and destination addresses to perform the crypto decrypt operation.

One or more computer storage media having computer-executable instructions for hardware offloading that, upon execution by a processor, cause the processor to at least:

program a network interface card with a mapping between (i) a connection identification (CID) for one or more Quick User Datagram Protocol Internet Connections (QUIC) data packets and (ii) a symmetric key and a crypto algorithm; and identify the CID for one or more QUIC data packets and send the CID to the network interface card, wherein the network interface card is configured to perform one of (i) receiving and decrypting the one or more QUIC data packets over a network or (ii) encrypting and transmitting the one or more data QUIC packets over the network, the symmetric key and the crypto algorithm for the decryption or encryption being identified by the network interface card based on the CID for the one or more QUIC data packets.

The one or more computer storage media described above, wherein the network interface card is configured to perform receive side scaling (RSS) using the CID when receiving the one or more QUIC data packets.

The one or more computer storage media described above, wherein the network interface card is configured to perform a receive segment coalescing (RSC) operation using the CID when receiving the one or more QUIC data packets.

The one or more computer storage media described above, wherein the network interface card is configured to perform a large send offload (LSO) operation using the CID when transmitting the one or more QUIC data packets.

The one or more computer storage media described above, wherein the network interface card is configured to perform chopping up the one or more QUIC data packets, using a process that does not result in IP fragmentation, before transmitting the one or more QUIC data packets.

The one or more computer storage media described above, wherein the computer-executable further cause the processor to at least offload one of an Advanced Encryption Standard (AES), Galois/Counter Mode (GCM) or ChaCha/Poly crypto to the network interface card as part of a crypto offload, and use the CID and a 4-tuple of source and destination addresses to perform the crypto decrypt operation.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for training a neural network. The illustrated one or more processors 1104 together with the computer program code stored in memory 1114 constitute exemplary processing means for using and/or training neural networks.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for hardware offloading, the system comprising:
   at least one processor;
   a network interface card comprising a plurality of processing units; and
   at least one memory comprising computer program code, the at least one memory and the computer program code configured to, with the at least one processor, cause the at least one processor to:
      program the network interface card with a mapping between (i) a connection identification (CID) for one or more QUIC data packets and (ii) a symmetric key and a crypto algorithm, wherein programming the network interface card comprises preprogramming the network interface card after an initial connection handshake and before performing a crypto decrypt operation;
      receive one or more data packets over a network,
      parse the one or more data packets to identify the one or more data packets as QUIC data packets and then obtain the CID for the QUIC data packets,
      send the CID to the network interface card, wherein the network interface card is configured to:
      identify the symmetric key and the crypto algorithm based on the CID,
      select one or more processing units of the plurality of processing units to process the QUIC data packets, the one or more processing units selected using a mapping in a hash table based on the CID, wherein a hashing algorithm accesses the hash table to map one or more keys defined by the CID to values for selecting the one or more processing units,
      process the QUIC data packets using the selected one or more processing units, the processing comprising performing the crypto decrypt operation on the QUIC data packets, and reassembling the QUIC data packets, and
      receive the reassembled QUIC data packets from the network interface card.

2. The system of claim 1, wherein the hashing algorithm computes an array into one or more buckets or slots from which an output value is determined, the hash table located in an Internet Protocol (IP) layer of the protocol stack.

3. The system of claim 1, wherein the network interface card is configured to use the CID to perform one of a receive segment coalescing (RSC) operation or a receive side scaling (RSS) operation.

4. The system of claim 1, wherein the computer program code is further configured to, with the at least one processor, cause the at least one processor to send one or more packets to be transmitted over the network to the network interface card, wherein the network interface card is further configured to:
   identify the symmetric key and the crypto algorithm based on the CID to perform a crypto encrypt operation on the one or more data packets, and
   transmit the encrypted one or more data packets as QUIC data packets.

5. The system of claim 4, wherein the network interface card is configured to use the CID to perform a large send offload (LSO) operation.

6. The system of claim 4, wherein the network interface card is configured to chop up the one or more QUIC data packets using a process that does not result in IP fragmentation.

7. The system of claim 1, wherein the computer program code is further configured to, with the at least one processor, cause the at least one processor to offload one of an Advanced Encryption Standard (AES), Galois/Counter Mode (GCM) or ChaCha/Poly crypto to the network interface card as part of a crypto offload.

8. The system of claim 1, wherein the network interface card is configured to use the CID and a 4-tuple of source and destination addresses to perform the crypto decrypt operation.

9. A computerized method for hardware offloading, the computerized method comprising:
   programming a network interface card with a mapping between (i) a connection identification (CID) for one or more QUIC data packets and (ii) a symmetric key and a crypto algorithm, the network interface card comprising a plurality of processing units, wherein programming the network interface card comprises preprogramming the network interface card after an initial connection handshake and before performing decrypting and encrypting operations; and
   identifying the CID for one or more QUIC data packets and sending the CID to the network interface card, wherein the network interface card is configured to:
      select one or more processing units of the plurality of processing units to process the QUIC data packets, the one or more processing units selected using a mapping in a hash table based on the CID, wherein a hashing algorithm accesses the hash table to map one or more keys defined by the CID to values for selecting the one or more processing units, and
      process the QUIC data packets using the selected one or more processing units, the processing comprising performing one of (i) receiving and decrypting the one or more QUIC data packets over a network or (ii) encrypting and transmitting the one or more QUIC data packets over the network, the symmetric key and the crypto algorithm for the decryption or encryption being identified by the network interface card based on the CID for the one or more QUIC data packets.

10. The computerized method of claim 9, further comprising performing, by the network interface card, a receive side scaling (RSS) operation using the CID when receiving the one or more QUIC data packets.

11. The computerized method of claim 9, further comprising performing, by the network interface card, a receive a segment coalescing (RSC) operation using the CID when receiving the one or more QUIC data packets.

12. The computerized method of claim 9, further comprising performing, by the network interface card, a large send offload (LSO) operation using the CID when transmitting the one or more QUIC data packets.

13. The computerized method of claim 12, further comprising performing, by the network interface card, chopping up the one or more QUIC data packets, using a process that does not result in IP fragmentation, before transmitting the one or more QUIC data packets.

14. The computerized method of claim 9, further comprising offloading one of an Advanced Encryption Standard (AES), Galois/Counter Mode (GCM) or ChaCha/Poly crypto to the network interface card as part of a crypto offload, and using the CID and a 4-tuple of source and destination addresses to perform the crypto decrypt operation.

15. One or more computer storage media having computer-executable instructions for hardware offloading that, upon execution by a processor, cause the processor to at least:
program a network interface card with a mapping between (i) a connection identification (CID) for one or more (QUIC) data packets and (ii) a symmetric key and a crypto algorithm, the network interface card comprising a plurality of processing units; wherein programming the network interface card comprises preprogramming the network interface card after an initial connection handshake and before performing decrypting and encrypting operations; and
identify the CID for one or more QUIC data packets and send the CID to the network interface card, wherein the network interface card is configured to:
select one or more processing units of the plurality of processing units to process the QUIC data packets, the one or more processing units selected using a mapping in a hash table based on the CID, wherein a hashing algorithm accesses the hash table to map one or more keys defined by the CID to values for selecting the one or more processing units, and
process the QUIC data packets using the selected one or more processing units the processing comprising performing one of (i) receiving and decrypting the one or more QUIC data packets over a network or (ii) encrypting and transmitting the one or more QUIC data packets over the network, the symmetric key and the crypto algorithm for the decryption or encryption being identified by the network interface card based on the CID for the one or more QUIC data packets.

16. The one or more computer storage media of claim 15, wherein the network interface card is configured to perform receive side scaling (RSS) using the CID when receiving the one or more QUIC data packets.

17. The one or more computer storage media of claim 15, wherein the network interface card is configured to perform a receive segment coalescing (RSC) operation using the CID when receiving the one or more QUIC data packets.

18. The one or more computer storage media of claim 15, wherein the network interface card is configured to perform a large send offload (LSO) operation using the CID when transmitting the one or more QUIC data packets.

19. The one or more computer storage media of claim 15, wherein the network interface card is configured to perform chopping up the one or more QUIC data packets, using a process that does not result in IP fragmentation, before transmitting the one or more QUIC data packets.

20. The one or more computer storage media of claim 15, wherein the computer-executable further cause the processor to at least offload one of an Advanced Encryption Standard (AES), Galois/Counter Mode (GCM) or ChaCha/Poly crypto to the network interface card as part of a crypto offload, and use the CID and a 4-tuple of source and destination addresses to perform the crypto decrypt operation.

* * * * *